United States Patent
Zulkifli et al.

(10) Patent No.: US 11,447,397 B1
(45) Date of Patent: Sep. 20, 2022

(54) MATERIALS, METHODS AND TECHNIQUES FOR GENERATING RARE EARTH CARBONATES

(71) Applicant: Lynas Rare Earths Limited, East Perth WA (AU)

(72) Inventors: Norazihan Zulkifli, Pahang Darul Makmur (MY); Mohd Anis Shah Mohd Zainal, Pahang Darul Makmur (MY); Luke Darbyshire, Pahang Darul Makmur (MY); Peter Ryan, Pahang Darul Makmur (MY); Aznor Yahya, Pahang Darul Makmur (MY); Ermie Fadhullah Kassim, Pahang Darul Makmur (MY)

(73) Assignee: Lynas Rare Earths Limited, East Perth WA (AU)

( * ) Notice: Subject to any disclaimer, the term of this patent is extended or adjusted under 35 U.S.C. 154(b) by 0 days.

(21) Appl. No.: 17/543,326

(22) Filed: Dec. 6, 2021

Related U.S. Application Data (60) Provisional application No. 63/163,566, filed on Mar. 19, 2021.

(51) Int. Cl.
  *C01F 17/247* (2020.01)
  *B01J 19/00* (2006.01)
  *C01F 17/10* (2020.01)

(52) U.S. Cl.
  CPC ......... *C01F 17/247* (2020.01); *B01J 19/0013* (2013.01); *B01J 19/0033* (2013.01); *C01F 17/10* (2020.01); *B01J 2219/00164* (2013.01); *B01J 2219/00177* (2013.01); *C01P 2006/80* (2013.01)

(58) Field of Classification Search
  CPC ..... C01F 17/247; C01F 17/10; B01J 19/0013; B01J 19/0033; B01J 2219/00164; B01J 2219/00177; C01P 2006/80
  See application file for complete search history.

(56) References Cited

U.S. PATENT DOCUMENTS

| | | | |
|---|---|---|---|
| 3,768,989 A | 10/1973 | Goetzinger et al. | |
| 9,228,248 B2 | 1/2016 | Sugita et al. | |
| 2020/0339435 A1* | 10/2020 | Katz | C09B 31/057 |

FOREIGN PATENT DOCUMENTS

| | | |
|---|---|---|
| AU | 2016203453 A1 | 12/2016 |
| CN | 86100671 A | 8/1987 |
| CN | 1009332 B | 8/1990 |
| CN | 1931788 A | 3/2007 |
| CN | 101319275 A | 12/2008 |
| CN | 102936029 A | 2/2013 |
| CN | 104774561 A | 7/2015 |
| CN | 107760867 A | 3/2018 |
| CN | 211771501 U | 10/2020 |
| JP | 2013139616 A | 7/2013 |
| JP | 2016011435 A | 1/2016 |
| KR | 970033090 A | 7/1999 |
| RU | 2158317 C1 | 10/2000 |
| WO | 2009021389 A1 | 2/2009 |

OTHER PUBLICATIONS

Silva et al. "Selective Precipitation of High-Quality Rare Earth Oxalates or Carbonates from a Purified Sulfuric Liquor Containing Soluble Impurities" Mining, Metallurgy & Exploration (2019) 36:967-977 (Year: 2019).*
International Search Report and Written Opinion for Application No. PCT/IB2021/061382 dated Mar. 8, 2022 (7 pages).
Han, "Characteristics of Precipitation of Rare Earth Elements with Various Precipitants", Minerals, 2020., vol. 10, No. 178, 13 pages.
Da Silva et al., "Selective removal of impurities from rare earth sulphuric liquor using different reagents", Minerals Engineering, 2018, vol. 127, pp. 238-246.
Chi et al., "Solution-Chemistry Analysis of Ammonium Bicarbonate Consumption in Rare-Earth-Element Precipitation", Metallurgical and Materials Transactions B, 2003, vol. 34, pp.

* cited by examiner

*Primary Examiner* — Steven J Bos
*Assistant Examiner* — Syed T Iqbal
(74) *Attorney, Agent, or Firm* — Michael Best & Friedrich LLP (57) ABSTRACT

Mixed rare earth carbonate may be prepared by mixing a rare earth sulfate solution with a precipitating agent comprising a first sodium carbonate ($Na_2CO_3$) solution, to form a first mixture, and generating a higher sulfate rare earth carbonate wet cake from the first mixture. The higher sulfate rare earth carbonate wet cake can be mixed with a second sodium carbonate ($Na_2CO_3$) solution to form a second mixture, and a lower sulfate rare earth carbonate can be generated from the second mixture.

12 Claims, 1 Drawing Sheet

MATERIALS, METHODS AND TECHNIQUES FOR GENERATING RARE EARTH CARBONATES

CROSS-REFERENCE TO RELATED APPLICATIONS

This application claims priority to U.S. Provisional Application No. 63/163,566, filed Mar. 19, 2021, which is hereby incorporated in its entirety.

TECHNICAL FIELD

The present disclosure relates to rare earth carbonates. More specifically, materials and methods disclosed and contemplated herein relate to production of rare earth carbonates with low sulfate from rare earth sulfate solutions.

INTRODUCTION

Rare earths may be obtained through the processing of mined rare earth minerals. These mined rare earth minerals are processed in a sequential manner until they are of a form that may be used as an input to rare earth separation processes. Monazite, a rare earth mineral, is processed by mining and acid cracking using concentrated sulfuric acid, followed by leaching in water. The output of this sequential process is a rare earth sulfate solution. Before the rare earth sulfate solution may be introduced into a solvent extraction process to separate the rare earth elements, the rare earth sulfate solution must be converted to a rare earth chloride solution, which can be further processed to isolate various rare earths of interest.

Generally, three methods are currently used for producing mixed rare earth chloride solutions from mixed rare earth sulfate solutions. A first method involves precipitating a mixed rare earth double salt with sodium chloride (NaCl), converting the mixed rare earth double salt to mixed rare earth hydroxide with caustic soda and, downstream, dissolving with hydrochloric acid. A second method is to precipitate a mixed rare earth carbonate using ammonium bicarbonate and, downstream, dissolving rare earth carbonate with hydrochloric acid (HCl). A third method is to extract the rare earths from the sulfate solution with a solvent extraction process, such as using di-(2-ethylhexyl)phosphoric acid (DEPHA), and then strip the solvent using hydrochloric acid. All of these processes will produce a mixed rare earth chloride solution with low sulfate content.

The instant disclosure is directed to methods of producing a mixed rare earth carbonate with low sulfate content in a continuous manner from mixed rare earth sulfate solutions using sodium carbonate. Resulting mixed rare earth carbonates can be dissolved in hydrochloric acid to produce a mixed rare earth chloride solution, which in turn can be used as an input to a rare earth solvent extraction process.

SUMMARY

In one aspect, a method for preparing a rare earth carbonate is disclosed. The method may include mixing a rare earth sulfate solution with a precipitating agent comprising a first sodium carbonate ($Na_2CO_3$) solution, thereby continuously forming a first mixture; generating a higher sulfate rare earth carbonate wet cake from the first mixture; mixing the higher sulfate rare earth carbonate wet cake with a second sodium carbonate ($Na_2CO_3$) solution to form a second mixture; and generating a lower sulfate rare earth carbonate from the second mixture.

In another aspect, a system for generating rare earth carbonates is disclosed. An example system may comprise a first vessel in fluid communication with a rare earth sulfate solution source and a precipitating agent source, the first vessel comprising first vessel agitation apparatus; a second vessel in fluid communication with the first vessel, the second vessel comprising second vessel agitation apparatus; a filter unit in fluid communication with the second vessel; a third vessel in fluid communication with the filter unit and a sodium carbonate solution source, the third vessel comprising third vessel agitation apparatus; and a second filter unit in fluid communication with the third vessel.

There is no specific requirement that a material, technique or method relating to rare earth carbonates include all of the details characterized herein to obtain some benefit according to the present disclosure. Thus, the specific examples characterized herein are meant to be exemplary applications of the techniques described, and alternatives are possible.

DETAILED DESCRIPTION

Materials, methods and techniques disclosed and contemplated herein relate to generating mixed rare earth carbonates. Generally, exemplary mixed rare earth carbonates may be generated with precipitation and sulfate removal operations. These operations may be performed as continuous processes. Exemplary mixed rare earth carbonates may comprise less than about 2 wt. % sulfate.

I. Definitions

Unless otherwise defined, all technical and scientific terms used herein have the same meaning as commonly understood by one of ordinary skill in the art. In case of conflict, the present document, including definitions, will control. Example methods and materials are described below, although methods and materials similar or equivalent to those described herein can be used in practice or testing of the present disclosure. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

Definitions of specific functional groups and chemical terms are described in more detail below. For purposes of this disclosure, the chemical elements are identified in accordance with the Periodic Table of the Elements, CAS version, Handbook of Chemistry and Physics, 75$^{th}$ Ed., inside cover, and specific functional groups are generally defined as described therein.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The modifiers "about" or "approximately" used in connection with a quantity are inclusive of the stated value and has the meaning dictated by the context (for example, it includes at least the degree of error associated with the measurement of the particular quantity). These modifiers should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

II. Exemplary Materials

Exemplary methods and techniques use and generate various materials. Example materials include mixed rare earth sulfate solutions, precipitating agents comprising sodium carbonate ($Na_2CO_3$) solutions, and rare earth carbonates.

A. Exemplary Mixed Rare Earth Sulfate Solutions

Exemplary mixed rare earth sulfate solutions comprise one or more rare earth components dissolved in a sulfate solution. In some instances, mixed rare earth sulfate solutions are generated from Monazite cracking. Example rare earths dissolved in mixed rare earth sulfate solutions can include, without limitation, lanthanum, cerium, neodymium, and/or praseodymium. In some instances, exemplary mixed rare earth sulfate solutions comprise one or more impurities. Example impurities include, but are not limited to, silica, iron, and sodium.

In some instances, mixed rare earth sulfate solutions may have a rare earth concentration of about 5 g/L to about 45 g/L. In various implementations, mixed rare earth sulfate solutions may have a rare earth concentration of at least 5 g/L; at least 10 g/L; at least 15 g/L; at least 20 g/L; at least 25 g/L; at least 30 g/L; at least 35 g/L; or at least 40 g/L. In various implementations, mixed rare earth sulfate solutions may have a rare earth concentration of no more than 45 g/L; no more than 40 g/L; no more than 35 g/L; no more than 30 g/L; no more than 25 g/L; no more than 20 g/L; no more than 15 g/L; or no more than 10 g/L. In various implementations, mixed rare earth sulfate solutions may have a rare earth concentration of 5-45 g/L; 10-40 g/L; 15-35 g/L; or 20-30 g/L.

In some instances, mixed rare earth sulfate solutions may have a pH of about 2.0 to about 4.5. In various implementations, mixed rare earth sulfate solutions may have a pH of at least 2.0; at least 2.5; at least 3.0; at least 3.5; or at least 4.0. In various implementations, mixed rare earth sulfate solutions may have a pH of no more than 4.5; no more than 4.0; no more than 3.5; no more than 3.0; or no more than 2.5. In various implementations, mixed rare earth sulfate solutions may have a pH of 2.0-4.5; 2.5-4.25; 3.0-4.0; or 3.5-4.0.

B. Exemplary Sodium Carbonate Solutions

Exemplary precipitating agents typically comprise sodium carbonate ($Na_2CO_3$) solutions. In some instances, exemplary precipitating agents consist essentially of sodium carbonate ($Na_2CO_3$) solution. In some instances, exemplary precipitating agents consist of sodium carbonate ($Na_2CO_3$) solution. Exemplary precipitating agents comprising sodium carbonate solution used during one or more precipitation operations are termed "first sodium carbonate solutions" and "second sodium carbonate solutions" for ease of discussion. The distinction between these two solutions is described.

In some instances, a concentration of the first sodium carbonate ($Na_2CO_3$) solution may be about 5 wt. % to about 20 wt. %. In various implementations, a concentration of the first sodium carbonate ($Na_2CO_3$) solution may be at least 5 wt. %; at least 10 wt. %; at least 15 wt. %; or at least 18 wt. %. In various implementations, a concentration of the first sodium carbonate ($Na_2CO_3$) solution may be no more than 20 wt. %; no more than 15 wt. %; no more than 10 wt. %; or no more than 5 wt. %. In various implementations, a concentration of the first sodium carbonate ($Na_2CO_3$) solution may be 5-20 wt. %; 5-15 wt. %; or 5-10 wt. %.

In some instances, exemplary second sodium carbonate ($Na_2CO_3$) solutions may have a concentration of about 12 wt. % to about 40 wt. %. In various implementations, second sodium carbonate ($Na_2CO_3$) solutions may have a concentration of at least 12 wt. %; at least 15 wt. %; at least 20 wt. %; at least 25 wt. %; at least 30 wt. %; or at least 35 wt. %. In various implementations, second sodium carbonate ($Na_2CO_3$) solutions may have a concentration of no more than 40 wt. %; no more than 35 wt. %; no more than 30 wt. %; no more than 25 wt. %; no more than 20 wt. %; or no more than 15 wt. %. In various implementations, second sodium carbonate ($Na_2CO_3$) solutions may have a concentration of 12-40 wt. %; 12-30 wt. %; or 12-20 wt. %.

C. Exemplary Rare Earth Carbonates

Exemplary systems, methods and techniques may generate higher sulfate rare earth carbonates and lower sulfate rare earth carbonates. The terms "higher" and "lower" are used solely to indicate relative sulfate contents in different carbonates. Exemplary rare earth carbonates may be generated as wet cakes which is defined by weight percent total rare earth oxide (TREO) concentration.

In some instances, higher sulfate rare earth carbonates may comprise about 45 wt. % to about 72 wt. % TREO content. In various implementations, higher sulfate rare earth carbonates may comprise a TREO content of at least 45 wt. %; at least 50 wt. %; at least 55 wt. %; at least 60 wt. %; at least 65 wt. %; or at least 70 wt. %. In various implementations, higher sulfate rare earth carbonates may comprise a TREO content of no more than 72 wt. %; no more than 70 wt. %; no more than 65 wt. %; no more than 60 wt. %; no more than 55 wt. %; or no more than 50 wt. %. In various implementations, higher sulfate rare earth carbonates may comprise a TREO content of 45-72 wt. %; 50-70 wt. %; or 50-60 wt. %.

In some instances, higher sulfate rare earth carbonates may have a loss of ignition (LOI) of about 28% to about 55%. In various implementations, higher sulfate rare earth carbonates may have an LOI of at least 28%; at least 30%; at least 35%; at least 40%; at least 45%; or at least 50%. In various implementations, higher sulfate rare earth carbonates may have an LOI of no more than 55%; no more than 50%; no more than 45%; no more than 40%; no more than 35%; or no more than 30%. In various implementations, higher sulfate rare earth carbonates may have an LOI of 28-55%; 30-50%; or 35-45%.

In some instances, higher sulfate rare earth carbonates may comprise about 5 wt. % to about 25 wt. % sulfate ($SO_4^{2-}$). In various implementations, higher sulfate rare earth carbonates may comprise at least 5 wt. % sulfate; at least 10 wt. % sulfate; at least 15 wt. % sulfate; or at least 20 wt. % sulfate. In various implementations, higher sulfate rare earth carbonates may comprise no more than 25 wt. % sulfate; no more than 20 wt. % sulfate; no more than 15 wt. % sulfate; or no more than 10 wt. % sulfate. In various implementations, higher sulfate rare earth carbonates may comprise 5-25 wt. % sulfate; 8-20 wt. % sulfate; or 10-19 wt. % sulfate.

In some instances, lower sulfate rare earth carbonate may comprise between 200 ppm and 2 wt. % sulfate ($SO_4^{2-}$). In various implementations, lower sulfate rare earth carbonate may comprise at least 200 ppm sulfate; at least 250 ppm sulfate; at least 500 ppm sulfate; at least 750 ppm sulfate; at least 1 wt. % sulfate; at least 1.5 wt. % sulfate; or at least 1.75 wt. % sulfate. In various implementations, lower sulfate rare earth carbonate may comprise no more than 2.0 wt. % sulfate; no more than 1.75 wt. % sulfate; no more than 1.5 wt. % sulfate; no more than 1.25 wt. % sulfate; no more than 1.0 wt. % sulfate; no more than 750 ppm sulfate; no more than 500 ppm sulfate; or no more than 250 ppm sulfate. In various implementations, lower sulfate rare earth carbonate may comprise 0.02-2.0 wt. % sulfate; 0.04-1.5 wt. % sulfate; 0.05-1.0 wt. % sulfate; or 0.1-1.0 wt. % sulfate.

In some instances, lower sulfate rare earth carbonate may comprise between 40 wt. % and 72 wt. % rare earth oxide (REO). In various implementations, lower sulfate rare earth carbonate may comprise at least 40 wt. % REO; at least 50 wt. % REO; at least 55 wt. % REO; at least 60 wt. % REO; at least 65 wt. % REO; or at least 70 wt. % REO. In various implementations, lower sulfate rare earth carbonate may comprise no more than 72 wt. % REO; no more than 70 wt. % REO; no more than 65 wt. % REO; no more than 60 wt. % REO; no more than 55 wt. % REO; no more than 50 wt. % REO; or no more than 45 wt. % REO. In various implementations, lower sulfate rare earth carbonate may comprise 40-72 wt. % REO; 45-72 wt. % REO; 45-65 wt. % REO; or 50-60 wt. % REO.

III. Example Methods

Example methods for preparing rare earth carbonates disclosed and contemplated herein can include one or more operations. Broadly, exemplary methods include one or more precipitation operations and one or more sulfate removal operations. In various implementations, some, most, or all operations in exemplary methods may be arranged and performed continuously (i.e., not in a batch operation).

An example method may begin by mixing a rare earth sulfate solution with a precipitating agent to form a first mixture. Exemplary precipitating agents are described in greater detail above and comprise a first sodium carbonate ($Na_2CO_3$) solution. In some implementations, a temperature of the rare earth sulfate solution and/or the precipitating agent may be ambient temperature.

In some instances, a temperature of the precipitating agent, prior to mixing with the rare earth sulfate solution, may be between about 25° C. and about 45° C. In various implementations, a temperature of the precipitating agent, prior to mixing with the rare earth sulfate solution, may be at least 25° C.; at least 30° C.; at least 35° C.; at least 40° C.; or at least 42.5° C. In various implementations, a temperature of the precipitating agent, prior to mixing with the rare earth sulfate solution, may be no more than 45° C.; no more than 40° C.; no more than 35° C.; no more than 30° C.; or no more than 27.5° C. In various implementations, a temperature of the precipitating agent, prior to mixing with the rare earth sulfate solution, may be between 25° C. and 45° C.; between 25° C. and 40° C.; between 25° C. and 35° C.; between 25° C. and 30° C.; or between 27.5° C. and 32.5° C.

Flow rates of the precipitating agent and/or rare earth sulfate solution may be adjusted to maintain a pH of the first mixture to desired pH ranges. Accordingly, exemplary methods may comprise monitoring a pH of the first mixture and adjusting a flow rate of the precipitating agent and/or rare earth sulfate solution to maintain a pH of the first mixture to be within desired pH ranges. In some instances, exemplary methods may comprise monitoring a pH of the first mixture and adjusting a flow rate of the precipitating agent while holding a flow rate of the rare earth sulfate solution constant, to maintain a pH of the first mixture to be within desired pH ranges.

In some implementations, a pH of the first mixture may be at least 5.0; at least 5.5; at least 6.0; at least 6.5; or at least 7.0. In some implementations, a pH of the first mixture may be no more than 7.5; no more than 7.0; no more than 6.5; no more than 6.0; or no more than 5.5. For instance, a pH of the first mixture may be controlled to be between about 5.0 and about 7.5; between about 5.5 and about 6.5; between about 5.75 and about 6.25; between about 5.9 and about 6.1; between about 5.8 and about 6.0; between about 5.95 and 6.05; or between about 5.99 and about 6.01.

In some instances, a temperature of the first mixture may be controlled to be within a desired temperature range. For example, a temperature of the first mixture may be controlled to be about 20° C. to about 60° C. In various implementations, a temperature of the first mixture may be controlled to be at least about 20° C.; at least about 25° C.; at least about 30° C.; at least about 35° C.; at least about 40° C.; at least about 45° C.; at least about 50° C.; or at least about 55° C. In various implementations, a temperature of the first mixture may be controlled to be no more than about 60° C.; no more than about 55° C.; no more than about 50° C.; no more than about 45° C.; no more than about 40° C.; no more than about 35° C.; or no more than about 30° C. In various implementations, a temperature of the first mixture may be controlled to be between 20° C. and 60° C.; between 20° C. and 45° C.; or between 20° C. and 35° C.

Exemplary rare earth sulfate solutions are mixed with precipitating agents under agitation. Various agitation power to volume (P/V) values may be used. In some implementations, an agitation speed during mixing is no less than 0.5 kw/m³; no less than 0.65 kw/m³; or no less than 0.7 kw/m³. In various implementations, an agitation speed during mixing is between 0.5 kw/m³ and 0.7 kw/m³; between 0.5-0.65 kw/m³; between 0.65-0.7 kw/m³;

Resulting mixtures comprising rare earth sulfate solution and precipitating agent may be provided to one or more intermediate vessels, alternatively referred to as relay tanks. The one or more intermediate vessels may be agitated.

Exemplary methods may comprise monitoring and adjusting flow rates of mixtures comprising rare earth sulfate solution and precipitating agent to maintain desired residence times. For instance, exemplary methods may comprise providing mixtures comprising rare earth sulfate solution and precipitating agent such that residence time in the one or more intermediate vessels is no less than 2 hours; no less than 3 hours; no less than 4 hours; no less than 5 hours; or no less than 5.5 hours. Exemplary methods may comprise providing mixtures comprising rare earth sulfate solution and precipitating agent such that residence time in the one or more intermediate vessels is no more than 6 hours; no more than 5 hours; no more than 4 hours; no more than 3.5 hours; or no more than 2.5 hours. Exemplary methods may comprise providing mixtures comprising rare earth sulfate solution and precipitating agent such that residence time in the one or more intermediate vessels is between about 2 hours to about 6 hours; about 3 hours to about 6 hours; about 3 hours to about 5 hours; or about 4 hours to about 6 hours.

Resulting mixtures may be provided from the one or more intermediate vessels to one or more filtration units. In some instances, a filtration unit may have a mesh size of about 20 µm to about 40 µm, although other sizes are contemplated.

After filtration, a higher sulfate rare earth carbonate wet cake is obtained. In some instances, the higher sulfate rare earth carbonate wet cake is washed. Water may be used for washing the higher sulfate rare earth carbonate. In various implementations, a rare earth recovery in the higher sulfate rare earth carbonate may be at least 97%.

Next, higher sulfate rare earth carbonate wet cake is mixed with a second sodium carbonate solution to form a second mixture. Additional details about exemplary second sodium carbonate solutions are provided in greater detail above. In various instances, exemplary second sodium carbonate solutions have a temperature of no less than about 20° C.; no less than about 30° C.; no less than about 40° C.; no less than about 50° C.; no less than about 60° C.; or no less than about 70° C. In various instances, exemplary second sodium carbonate solutions have a temperature of no more than about 80° C.; no more than about 70° C.; no more than about 60° C.; no more than about 50° C.; no more than about 40° C.; or no more than about 30° C. In various instances, exemplary second sodium carbonate solutions have a temperature between about 20° C. to about 80° C., about 25° C. to about 70° C.; about 20° C. to about 50° C.; about 20° C. to about 35° C.; about 35° C. to about 65° C.; or about 40° C. to about 60° C.

Exemplary second mixtures may be agitated for a predetermined period of time. In various instances, exemplary second mixtures may be agitated for at least 1 hour; at least 2 hours; at least 3 hours; at least 4 hours; at least 5 hours; at least 6 hours; at least 7 hours; at least 8 hours; or at least 9 hours. In various instances, exemplary second mixtures may be agitated for no more than 10 hours; no more than 9 hours; no more than 8 hours; no more than 7 hours; no more than 6 hours; no more than 5 hours; no more than 4 hours; no more than 3 hours; or no more than 2 hours. In various instances, exemplary second mixtures may be agitated for about 1 hour to about 10 hours; about 2 hours to about 8 hours; or about 2 hours to about 6 hours.

Exemplary second mixtures may be agitated at various agitation powers. For instance, exemplary second mixtures may be agitated at a power to volume (P/V) ratio of at least 0.7 kw/m³. In some instances, exemplary second mixtures may be agitated with an agitation speed of at least 200 rpm; at least 275 rpm; at least 300 rpm; at least 350 rpm; at least 400 rpm; or at least 425 rpm. In some instances, exemplary second mixtures may be agitated with an agitation speed of no more than 440 rpm; no more than 400 rpm; no more than 375 rpm; no more than 325 rpm; no more than 300 rpm; or no more than 250 rpm. In some instances, exemplary second mixtures may be agitated with an agitation speed of 200 rpm to 440 rpm; 250 rpm to 350 rpm; 275 rpm to 325 rpm; 200 rpm to 250 rpm; or 400 rpm to 440 rpm.

A solids content of exemplary second mixtures may be controlled to be within particular ranges. In various instances, exemplary second mixtures may be controlled to have a solids content of no less than 10%; no less than 20%; no less than 30%; no less than 40%; no less than 50%; or no less than 60%. In various instances, exemplary second mixtures may be controlled to have a solids content of about 10% to about 70%.

After mixing the second mixture for a predetermined period of time, an aqueous fluid may be added to the second mixture. In some instances, the aqueous fluid is water. Then the second mixture is provided to another filtration unit to generate a lower sulfate rare earth carbonate. In some instances, the lower sulfate rare earth carbonate may be washed. In some instances, filtering the second mixture may also include recovering sodium carbonate.

IV. Example Systems

Figure 1:
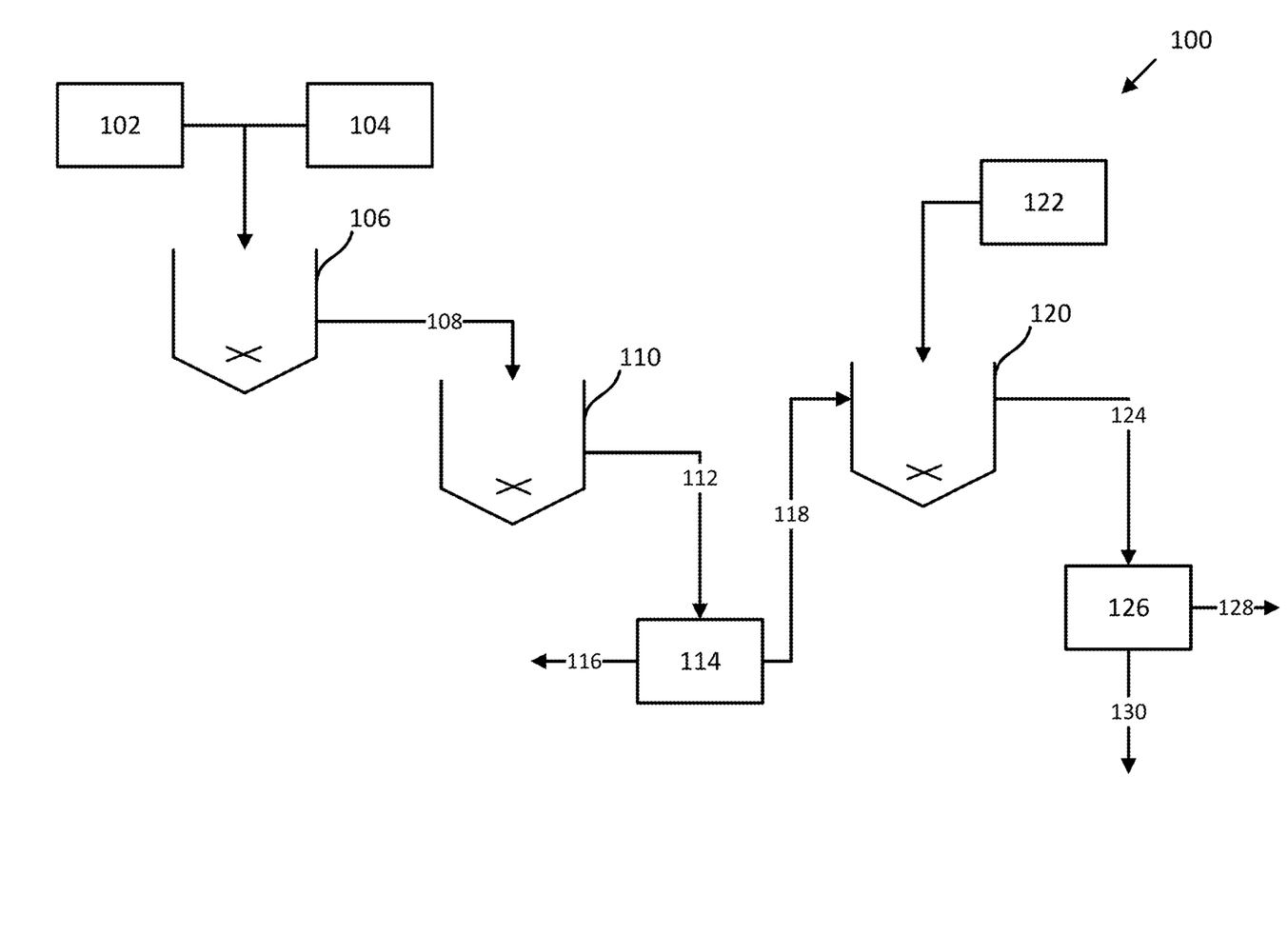
The FIGURE is a schematic depiction of an exemplary system for generating mixed rare earth carbonate.

FIG. 1 shows an exemplary system 100 for preparing rare earth carbonates. Exemplary system 100 includes vessel 106, vessel 110, filter unit 114, vessel 120, and filter unit 126. System 100 is configured such that one or more operations are performed continuously. Various process components, such as pumps, motors, valves, etc., are not shown for simplicity. Other embodiments may include more or fewer components.

Vessel 106 is in fluid communication with rare earth sulfate solution source 102 and precipitating agent source 104. Rare earth sulfate solution source 102 provides rare earth sulfate solution, described in greater detail above, to vessel 106 and may include one or more flow regulation units. Precipitating agent source 104 provides precipitating agent, described in greater detail above, to vessel 106 and may include one or more flow regulation units.

In some instances, vessel 106 includes pH monitoring equipment that may be in communication with flow regulation units that can adjust a flow rate from rare earth sulfate solution source 102 and/or precipitating agent source 104. As discussed in greater detail above, a pH of the first mixture in vessel 106 may be controlled to be between about 5.5 to about 6.5.

Vessel 106 includes agitation components arranged to mix rare earth sulfate solutions and precipitating agents. As discussed in greater detail above, an agitation power to volume (P/V) ratio in vessel 106 may be at least 0.5 kw/m³; at least 0.65 kw/m³; or at least 0.7 kw/m³.

Vessel 106 may include temperature regulation components, such as heating or cooling jackets, to maintain a fluid temperature within a desired range. Exemplary fluid temperatures for mixtures in vessel 106 are described in greater detail above. A mixture 108 comprising rare earth sulfate solution and precipitating agent is provided to vessel 110.

Vessel 110 serves as a relay tank between vessel 106, where mixing occurs, and filter unit 114. That is, mixture 112 is provided from vessel 110 to filter unit 114. Vessel 110 may include temperature regulation components, such as heating or cooling jackets, to maintain a fluid temperature within a desired range. Exemplary fluid temperatures for mixtures in vessel 110 are described in greater detail above.

Filter unit 114 generates a solids portion, higher sulfate rare earth carbonate 118, and a liquid portion, filtrate 116, from mixture 112. Liquid filtrate 116 may be discarded or processed and portions reused for precipitating agent source 104.

Vessel 120 is in fluid communication with second sodium carbonate solution source 122 and solids output 118 from filter unit 114. Vessel 120 may include temperature regulation components, such as heating or cooling jackets, to maintain a fluid temperature within a desired range.

Vessel 120 includes agitation components arranged to mix the higher sulfate rare earth carbonate and the second sodium carbonate solution. As discussed in greater detail above, an agitation power to volume ratio in vessel 1206 may be at least 0.7 kw/m$^3$.

After a predetermined residence time, mixture 124 is provided to filter unit 126. In some instances, mixture 124 is washed (not shown in the FIGURE) before being provided to filter unit 126. Washing of mixture 124 may be conducted in an intermediate unit positioned downstream of vessel 120 and filter unit 126.

Filter unit 126 generates a lower sulfate rare earth carbonate 128 and a liquid filtrate 130 from mixture 124. In some instances, the liquid filtrate 130 may be further processed in a sodium carbonate recovery unit (not shown in the FIGURE). Recovered sodium carbonate may be reused for precipitating agent source 104.

V. Experimental Examples

Experimental examples of precipitation and sulfate removal operations were conducted, and the results are discussed below.

A. Precipitation Operations

Five experimental examples were conducted for precipitation operations.

1. Raw Materials and Chemicals

Details about the rare earth sulfate solutions and the sodium carbonate solutions (precipitating agent) are provided in Table 1 below.

TABLE 1

Raw materials and chemical concentrations for precipitation operation experimental examples.

| | | Example 1 | Example 2 | Example 3 | Example 4 | Example 5 |
|---|---|---|---|---|---|---|
| Rare earth sulfate solutions | Concentration (g/l) | 22.0 | 22.0 | 22.0 | 20.3 | 20.3 |
| | pH | 3.7 | 3.7 | 3.7 | 3.6 | 3.6 |
| Na$_2$CO$_3$ solutions | Concentration-(g/l) | 50.0 | 50.0 | 50.0 | 50.0 | 50.0 |

2. Process Conditions

The rare earth sulfate solutions and sodium carbonate solutions were combined in a first vessel and agitated. The first vessel contents were maintained to have a temperature of 30° C.+/−2° C. An overhead agitator was used for mixing. Then the mixture was provided to a relay tank, filtered, and washed. Table 2 below provides details for the five experimental examples.

TABLE 2

Process parameters for experimental precipitation operations.

| | | Example 1 | Example 2 | Example 3 | Example 4 | Example 5 |
|---|---|---|---|---|---|---|
| Temperature (° C.) | | 28-32 | 28-32 | 28-32 | 28-32 | 28-32 |
| pH | | 6 | 6 | 6 | 6 | 6 |
| Agitation Speed (rpm) | | 700 | 700 | 700 | 700 | 700 |
| Process Flow rate | Rare earth sulphate (ml/hr) | 330 | 330 | 330 | 330 | 330 |
| | Na$_2$CO$_3$ (ml/hr) | 66 | 66 | 66 | 66 | 66 |
| Duration | Hours (hr) | 5.8 | 5.8 | 3.5 | 5.6 | 5.6 |
| Filtration | Pressure (kPa) | 4.5 | 4.5 | 4.5 | 4.5 | 4.5 |

3. Precipitation Operations Results

Each example's generated high sulfate rare earth carbonate was analyzed by Inductively Coupled Plasma Optical Emission Spectroscopy (ICP-OES) and Loss on Ignition (LOI).

TABLE 3

Results from experimental precipitation operations.

| Analytical Results | Example 1 | Example 2 | Example 3 | Example 4 | Example 5 |
|---|---|---|---|---|---|
| Mix rare earth carbonate (g) | 73.18 | 77.91 | 47.92 | 71.22 | 76.03 |
| Rare earth oxide (REO) content (wt. %) | 57.5% | 54.0% | 53.0% | 52.6% | 49.3% |
| Sulfate (SO$_4^{2-}$) content (wt. %) | 11.95% | 15.10% | 18.38% | 9.75% | 9.11% |

B. Sulfate Removal Operations

Five experimental examples were conducted for sulfate removal operations.

1. Raw Materials and Chemicals

Details about the sodium carbonate solutions and higher sulfate mixed rare earth carbonates are provided in Table 3 below.

TABLE 4

Raw materials and chemical concentrations for sulfate removal operation experimental examples.

| Raw materials & Chemical | | Example 6 | Example 7 | Example 8 | Example 9 | Example 10 |
|---|---|---|---|---|---|---|
| Na$_2$CO$_3$ Solution | Concentration (g/l) | 200 | 200 | 200 | 200 | 200 |
| Mix RE carbonate | REO (%) | 54.0% | 53.0% | 53.0% | 63.7% | 55.4% |
| | SO$_4^{2-}$(%) | 15.1% | 18.4% | 18.4% | 12.0% | 8.3% |

2. Process Conditions

The higher sulfate rare earth carbonates and sodium carbonate solutions were combined in a third vessel and agitated. A magnetic stirrer was used for mixing. Then the mixture was filtered and washed. Table 5 below provides details for the five experimental examples.

TABLE 5

Process parameters for experimental sulfur removal operations.

| | | Example 6 | Example 7 | Example 8 | Example 9 | Example 10 |
|---|---|---|---|---|---|---|
| Mass of Mix RE Carbonate | g | 50 | 50 | 50 | 50 | 50 |
| Volume | ml | 70 | 70 | 70 | 70 | 70 |
| Agitation | rpm | 210 | 210 | 210 | 400 | 430 |

TABLE 5-continued

Process parameters for experimental sulfur removal operations.

| | | Example 6 | Example 7 | Example 8 | Example 9 | Example 10 |
|---|---|---|---|---|---|---|
| Temperature | °C. | 35+/−1 | 45+/−1 | 35+/−1 | 45+/−1 | 25+/−1 |
| Duration | hours (hr) | 4.0 | 2.0 | 4.0 | 4.0 | 2.0 |
| Filtration | Pressure (kPa) | 4.5 | 4.5 | 4.5 | 4.5 | 4.5 |
| Washing | Water (l) | 0.5 | 0.5 | 0.5 | 0.5 | 0.5 |

3. Sulfur Removal Operations Results

Each example's generated lower sulfate rare earth carbonate was analyzed by Inductively Coupled Plasma Optical Emission Spectroscopy (ICP-OES) and Loss on Ignition (LOI). The results are shown below in Table 6.

TABLE 6

Results from experimental sulfur removal operations.

| Analytical Results | | Example 6 | Example 7 | Example 8 | Example 9 | Example 10 |
|---|---|---|---|---|---|---|
| REO | % | 53.4% | 47.4% | 52.5% | 41.1% | 40.9% |
| $SO_4^{2-}$ | % | 0.21% | 0.09% | 0.04% | 0.07% | 1.13% |

VI. Pilot-Scale Examples

Pilot-scale examples of rare earth carbonate precipitation and sulfate removal operations were conducted, and the results are discussed below.

1. Generation of Mixed Rare Earth Carbonate from Mixed Rare Earth Sulfate and Sodium Carbonate with Both Typical Impurity Levels.

A. Raw Materials and Chemicals

The mixed rare earth sulfate solution was taken directly from rare earth solvent extraction plant into the intermediate bulk container (IBC) in the pilot unit. The mixed rare earth sulfate solution had REO concentrations between 10-40 g/L and pH between 2.0 to 4.5. Levels of impurities were roughly 500 ppm Al and 25 ppm Fe.

The sodium carbonate solution of 5 wt. % to 10 wt. % was prepared separately and then pumped into the designated IBC in the pilot unit. The sodium carbonate solution had sulfate impurities of 17 ppm.

B. Continuous Precipitation of Mixed Rare Earth Carbonate

Co-addition precipitation occurred on a bulk scale in the IBC precipitation reactor with agitation by mixing rare earth sulfate with the sodium carbonate solution. The temperature was uncontrolled and ranged between 20° C. and 35° C. The slurry pH was maintained during the precipitation process in the range from 5.8 to 6.0. Rare earth sulfate flow rates were maintained at a ratio of 5:1 for rare earth sulfate to sodium carbonate solution, 208 L/hr and sodium carbonate flow rates, 42 L/hr, respectively. The flow rate of sodium carbonate was adjusted from this ratio only to maintain the slurry pH within 5.8 to 6.0 range.

As the solid slurry was generated, it was allowed to continuously overflow from the precipitation reactor IBC into a slurry overflow IBC. A portion of the supernatant (approx. 25-75%) was removed semi-continuously by siphoning off the supernatant, which increased the solids content from approximately 5% to 10% wt./wt. solids. The concentrated slurry was filtered in a batch mode using a stand-alone cylindrical filter press (Essa® type). To quantify the filterability of the slurry, the filtration time and pressure were fixed at 2 hours and 5 bar respectively, with a filter cake generation rate of 2500 gallons per day (gpd). After filtration, the mixed rare earth carbonate solids had a rare earth oxide (REO) content of 50 wt. % to 58 wt. % and sulfate concentration of 7 wt. % to 13 wt. %. The filter cake results from the pilot test are shown below in Table 7.

Table 7: Results for the continuous precipitation of mixed rare earth carbonate from the co-addition of mixed rare earth sulfate and sodium carbonate with normal impurity levels. Each analytical result represents the analysis of filter cakes generated from a single day pilot run.

| Analytical Results | | Example 11a | Example 11b | Example 11c | Example 11d | Example 11e |
|---|---|---|---|---|---|---|
| REO | wt. % | 57.96 | 50.49 | 55.03 | 50.95 | 54.52 |
| $SO_4^{2-}$ | wt. % | 13.0026 | 11.6590 | 7.7218 | 11.5494 | 11.3445 |

C. Sulphate Removal from Mixed Rare Earth Carbonate Solids with Sodium Carbonate The mixed rare earth carbonate solids from the process above in Step B was then contacted a second sodium carbonate solution with concentration of 20 wt. % to make a slurry mixture of 700 g per liter. Mixing of the slurry was performed for 4 hours at an ambient temperature of 20 to 35° C. This slurry was then filtered using a filter press to isolate the wet solids. The wet solids were then re-pulped in a third sodium carbonate solution of 5 wt % to make a slurry mixture of approximately 500 g per liter. Mixing of this slurry was performed for 1 hour at a target temperature of 40° C. or 60° C. with agitation speed of 300 rpm. The final slurry was then filtered using a filter press to isolate the wet solids, and then washed one time with deionized water (approximately 1:2 ratio of solids:liquid), and then filtered until semi-moist. The resulting solids were then analyzed for sulfate impurities by ICP-OES.

TABLE 7

Results for the laboratory scale work up of mixed rare earth carbonate with normal impurity levels. Each analytical result represents the analysis of same filter cake sample generated from a single day pilot run in Step B.

| | | Example 12 | Example 13 |
|---|---|---|---|
| Treatment Temperature | °C. | 40 | 60 |
| REO | % | 50.27 | 35.31 |
| $La_2O_3$/REO | % | 22.75 | 22.21 |
| $CeO_2$/REO | % | 50.25 | 51.05 |
| $Pr_6O_{11}$/REO | % | 5.18 | 5.05 |

TABLE 7-continued

Results for the laboratory scale work up of mixed rare earth carbonate with normal impurity levels. Each analytical result represents the analysis of same filter cake sample generated from a single day pilot run in Step B.

|  |  | Example 12 | Example 13 |
|---|---|---|---|
| $Nd_2O_3$/REO | % | 17.29 | 17.02 |
| $Sm_2O_3$/REO | % | 2.43 | 2.43 |
| Al | % | 0.86 | 0.46 |
| Fe | % | 0.23 | 0.07 |
| Na | % | 5.7 | 5.8 |
| $SO_4^{2-}$ | % | 0.43 | 0.18 |

More than 97% of the rare earth oxide content was recovered from the overall process in these examples.

Exemplary Embodiments

For reasons of completeness, various aspects of the technology are set out in the following numbered embodiments:

Embodiment 1: A method for preparing a rare earth carbonate, the method comprising:
mixing a rare earth sulfate solution with a precipitating agent comprising a first sodium carbonate ($Na_2CO_3$) solution, thereby continuously forming a first mixture;
generating a higher sulfate rare earth carbonate wet cake from the first mixture;
mixing the higher sulfate rare earth carbonate wet cake with a second sodium carbonate ($Na_2CO_3$) solution to form a second mixture; and
generating a lower sulfate rare earth carbonate from the second mixture.

Embodiment 2. The method according to embodiment 1, wherein generating the higher sulfate rare earth carbonate wet cake from the first mixture comprises:
agitating the first mixture;
controlling a pH of the first mixture to be about 5.5 to about 6.5; and
filtering the first mixture.

Embodiment 3. The method according to embodiment 1 or 2, wherein a solids content of the second mixture is 10% to about 70%; and wherein generating the lower sulfate rare earth carbonate from the second mixture comprises:
agitating the second mixture for a predetermined period of time;
adding an aqueous fluid to the second mixture; and
filtering the second mixture aqueous fluid combination.

Embodiment 4. The method according to any one of embodiments 1-3, wherein each operation is performed continuously.

Embodiment 5. The method according to any one of embodiments 1-4, wherein the rare earth sulfate solution has a rare earth concentration of about 5 g/L to about 45 g/L;
wherein a concentration of the first sodium carbonate ($Na_2CO_3$) solution is about 5 wt. % to about 20 wt. %;
wherein a total rare earth oxide (TREO) content of the higher sulfate rare earth carbonate wet cake is about 45% to about 72%;
wherein a Loss of Ignition (LOI) of the higher sulfate rare earth carbonate wet cake is about 28% to about 55%; and
wherein a sulfate content of the higher sulfate rare earth carbonate wet cake is about 5% to about 25%.

Embodiment 6. The method according to any one of embodiments 1-5, wherein an agitation power to volume (P/V) for agitating the first mixture is no less than 0.5 kw/m$^3$;
wherein a temperature of the first mixture during agitating is about 20° C. to about 60° C.; and
wherein an agitation speed for agitating the second mixture is between 200 rpm and 440 rpm.

Embodiment 7. The method according to embodiment 6, wherein the predetermined period of time is 1 hour to 10 hours.

Embodiment 8. The method according to any one of embodiments 1-7, wherein a concentration of the second sodium carbonate ($Na_2CO_3$) solution is about 12 wt. % to about 40 wt. %; and
wherein a temperature of the second sodium carbonate ($Na_2CO_3$) solution is about 20° C. to about 80° C.

Embodiment 9. The method according to any one of embodiments 1-8, further comprising recovering sodium carbonate ($Na_2CO_3$) during filtering the second mixture aqueous fluid combination; and
wherein the precipitating agent consists essentially of sodium carbonate.

Embodiment 10. The method according to any one of embodiments 1-9, wherein the pH of the first mixture is controlled to be more than 9.0;
wherein the temperature of the second sodium carbonate solution is 25° C. to 70° C.
wherein a concentration of the second sodium carbonate ($Na_2CO_3$) solution is 12 wt. % to 20 wt. %;
wherein the predetermined period of time is about 2 hours to about 6 hours; and
wherein a solids content of the second mixture is about 10% to about 70%.

Embodiment 11. The method according to any one of embodiments 1-10, wherein a recovery of the rare earth carbonate solids is greater than 97%;
wherein the lower sulfate rare earth carbonate comprises between 200 ppm and 2 wt. % sulfate ($SO_4^{2-}$); and
wherein the lower sulfate rare earth carbonate comprises between 45 wt. % and 72 wt. % rare earth oxide.

Embodiment 12. The method according to any one of embodiments 1-11, further comprising:
before generating the higher sulfate rare earth carbonate wet cake, providing the first mixture to one or more intermediate vessels,
wherein a residence time in the one or more intermediate vessels is from about 3 hours to about 6 hours.

Embodiment 13. A rare earth carbonate material generated using the method according to any one of embodiments 1-12.

Embodiment 14. A system for preparing rare earth carbonates, the system comprising:
a first vessel in fluid communication with a rare earth sulfate solution source and a precipitating agent source, the first vessel comprising first vessel agitation apparatus;
a second vessel in fluid communication with the first vessel, the second vessel comprising second vessel agitation apparatus;
a filter unit in fluid communication with the second vessel;
a third vessel in fluid communication with the filter unit and a sodium carbonate solution source, the third vessel comprising third vessel agitation apparatus; and
a second filter unit in fluid communication with the third vessel.

Embodiment 15. The system according to embodiments 14, the first vessel further comprising pH monitoring equipment configured to monitor a pH of a first mixture in the first vessel, the pH monitoring equipment in communication with one or more flow regulation units configured to adjust a flow rate of the rare earth sulfate solution source and the precipitating agent source.

Embodiment 16. The system according to embodiments 14 or 15, the filter unit generating a solids portion comprising higher sulfate rare earth carbonate and a liquid portion comprising filtrate, the filter unit being configured to provide the solids portion to the third vessel.

Embodiment 17. The system according to any one of embodiments 14-16, further comprising a sodium carbonate recovery unit, the second filter unit generating a lower sulfate rare earth carbonate and a liquid filtrate; the second filter unit providing the liquid filtrate to a sodium carbonate recovery unit.

Embodiment 18. The system according to any one of embodiments 14-17, the first vessel comprising temperature regulation components configured to maintain a first vessel fluid temperature between about 20° C. to about 60° C.

Embodiment 19. The system according to any one of embodiments 14-18, the second vessel comprising temperature regulation components configured to maintain a second vessel fluid temperature between about 20° C. to about 80° C.

Embodiment 20. The system according to any one of embodiments 14-19, the first vessel agitation apparatus configured to agitate the first vessel contents at a power to volume ratio of 0.5 kw/m$^3$ to 0.7 kw/m$^3$; and
   the third vessel agitation apparatus configured to agitate the third vessel contents at a power to volume ratio of 0.5 kw/m$^3$ to 0.7 kw/m$^3$.

It is understood that the foregoing detailed description and accompanying examples are merely illustrative and are not to be taken as limitations upon the scope of the disclosure. Various changes and modifications to the disclosed embodiments will be apparent to those skilled in the art. Such changes and modifications, including without limitation those relating to the chemical structures, substituents, derivatives, intermediates, syntheses, compositions, formulations, or methods of use, may be made without departing from the spirit and scope of the disclosure.

The invention claimed is:

1. A method for preparing a rare earth carbonate, the method comprising:
   mixing a rare earth sulfate solution with a precipitating agent comprising a first sodium carbonate ($Na_2CO_3$) solution, thereby continuously forming a first mixture;
   generating a higher sulfate rare earth carbonate wet cake from the first mixture;
   mixing the higher sulfate rare earth carbonate wet cake with a second sodium carbonate ($Na_2CO_3$) solution to form a second mixture; and
   generating a lower sulfate rare earth carbonate from the second mixture.

2. The method according to claim 1, wherein generating the higher sulfate rare earth carbonate wet cake from the first mixture comprises:
   agitating the first mixture;
   controlling a pH of the first mixture to be about 5.5 to about 6.5; and
   filtering the first mixture.

3. The method according to claim 2, wherein a solids content of the second mixture is 10% to about 70%; and wherein generating the lower sulfate rare earth carbonate from the second mixture comprises:
   agitating the second mixture for a predetermined period of time;
   adding an aqueous fluid to the second mixture to generate a second mixture aqueous fluid combination; and
   filtering the second mixture aqueous fluid combination.

4. The method according to claim 3, further comprising recovering sodium carbonate ($Na_2CO_3$) during filtering the second mixture aqueous fluid combination; and wherein the precipitating agent consists essentially of sodium carbonate.

5. The method according to claim 3, wherein an agitation power to volume (P/V) for agitating the first mixture is no less than 0.5 kw/m$^3$;
   wherein a temperature of the first mixture during agitating is about 20° C. to about 60° C.; and
   wherein an agitation speed for agitating the second mixture is between 200 rpm and 440 rpm.

6. The method according to claim 3, wherein the predetermined period of time is 1 hour to 10 hours.

7. The method according to claim 3, wherein mixing the rare earth sulfate solution with the precipitating agent is performed continuously;
   wherein generating the higher sulfate rare earth carbonate wet cake is performed continuously;
   wherein mixing the higher sulfate rare earth carbonate wet cake with the second sodium carbonate ($Na_2CO_3$) solution is performed continuously; and
   wherein generating the lower sulfate rare earth carbonate from the second mixture is performed continuously.

8. The method according to claim 1, wherein the rare earth sulfate solution has a rare earth concentration of about 5 g/L to about 45 g/L;
   wherein a concentration of the first sodium carbonate ($Na_2CO_3$) solution is about 5 wt. % to about 20 wt. %;
   wherein a total rare earth oxide (TREO) content of the higher sulfate rare earth carbonate wet cake is about 45% to about 72%;
   wherein a Loss of Ignition (LOI) of the higher sulfate rare earth carbonate wet cake is about 28% to about 55%; and
   wherein a sulfate content of the higher sulfate rare earth carbonate wet cake is about 5% to about 25%.

9. The method according to claim 1, wherein a concentration of the second sodium carbonate ($Na_2CO_3$) solution is about 12 wt. % to about 40 wt. %; and
   wherein a temperature of the second sodium carbonate ($Na_2CO_3$) solution is about 20° C. to about 80° C.

10. The method according to claim 1, wherein generating the lower sulfate rare earth carbonate from the second mixture comprises:
    agitating the second mixture for about 2 hours to about 6 hours;
    adding an aqueous fluid to the second mixture; and
    filtering the second mixture aqueous fluid combination to generate a second mixture aqueous fluid combination, wherein the pH of the first mixture is controlled to be more than 9.0;
    wherein a temperature of the second sodium carbonate solution is 25° C. to 70° C.;
    wherein a concentration of the second sodium carbonate ($Na_2CO_3$) solution is 12 wt. % to 20 wt. %; and
    wherein a solids content of the second mixture is about 10% to about 70%.

11. The method according to claim 1, wherein a recovery of rare earth carbonate solids is greater than 97%;
    wherein the lower sulfate rare earth carbonate comprises between 200 ppm and 2 wt. % sulfate ($SO_4^{2-}$); and
    wherein the lower sulfate rare earth carbonate comprises between 45 wt. % and 72 wt. % rare earth oxide.

12. The method according to claim 1, further comprising:
before generating the higher sulfate rare earth carbonate wet cake, providing the first mixture to one or more intermediate vessels,
wherein a residence time in the one or more intermediate vessels is from about 3 hours to about 6 hours.

* * * * *